(12) United States Patent
Payne

(10) Patent No.: US 8,874,519 B1
(45) Date of Patent: Oct. 28, 2014

(54) METHOD AND APPARATUS FOR RESTORING A TABLE IN A DATABASE

(75) Inventor: Michael Payne, Archer, FL (US)

(73) Assignee: Symantec Corporation, Mountain View, CA (US)

( * ) Notice: Subject to any disclaimer, the term of this patent is extended or adjusted under 35 U.S.C. 154(b) by 1350 days.

(21) Appl. No.: 12/002,593

(22) Filed: Dec. 18, 2007

(51) Int. Cl.
*G06F 17/30* (2006.01)

(52) U.S. Cl.
USPC .......................................... 707/640; 707/674

(58) Field of Classification Search
None
See application file for complete search history.

(56) References Cited

U.S. PATENT DOCUMENTS

| | | | |
|---|---|---|---|
| 7,472,242 B1* | 12/2008 | Deshmukh et al. | 711/162 |
| 7,634,511 B1* | 12/2009 | Freiheit et al. | 1/1 |
| 2002/0007363 A1* | 1/2002 | Vaitzblit | 707/202 |
| 2005/0038832 A1* | 2/2005 | Feigenbaum | 707/202 |
| 2005/0131966 A1* | 6/2005 | Lou | 707/204 |
| 2005/0192991 A1* | 9/2005 | Nomoto et al. | 707/101 |
| 2005/0278397 A1* | 12/2005 | Clark | 707/204 |
| 2006/0167925 A1* | 7/2006 | Smith et al. | 707/102 |
| 2007/0118510 A1* | 5/2007 | Li et al. | 707/3 |
| 2008/0183686 A1* | 7/2008 | Bhattacharyya et al. | 707/4 |

* cited by examiner

*Primary Examiner* — Son T Hoang
(74) *Attorney, Agent, or Firm* — Campbell Stephenson LLP

(57) ABSTRACT

A method and apparatus for restoring table data using one or more restoration commands, where the one or more restoration commands are generated at the time a backup of a database comprising the table data is created. The disclosed restoring of table data comprises identifying table data after completion of a backup process on the database and generating one or more commands for restoring the table data where the one or more restoration commands are generated prior to a request to restore the table data.

20 Claims, 4 Drawing Sheets

METHOD AND APPARATUS FOR RESTORING A TABLE IN A DATABASE

BACKGROUND

1. Field of the Invention

Embodiments of the present invention, generally, relate to database systems, and more particularly, to a method and apparatus for restoring a table in a database.

2. Description of the Related Art

A Structured Query Language (SQL) is commonly used to process and store data in a database (e.g., a relational database). Numerous versions or extensions of SQL are available, such as Transact-SQL (T-SQL). Various types of SQL commands (e.g., insert, delete, update and the like) are used to interact with a management system of the database. Such SQL commands may be embedded within a program and executed as needed. For example, an Application Programming Interface (API) comprising functions and objects implemented in SQL, including T-SQL, are utilized to operate and control the database.

The database comprises one or more tables where each table includes one or more rows of table data. Occasionally, a user of a database may accidentally lose, delete or incorrectly modify a single table in the database. In other instances, the single table is lost due to a minor flaw or error within the database. In either case, the single table must be efficiently restored in order to prevent delays and/or decreases in productivity of the user.

Currently, restoring the single table from the database is an inefficient and cumbersome process because the entire database must be restored before the single table can be restored. Additionally, the restoration process is initiated after the user informs the database administrator that the single table has been accidentally deleted, lost or modified incorrectly. Before the re-insertion process can be executed, the database administrator must create a program that locates, strips and formats all of the table data in a backup image. At this point, the program generates a restore script using Transact-SQL (T-SQL) insert commands to restore the table data from the single table. The restore script uses the T-SQL insert command to reinsert the table data into the database row-by-row.

Accordingly, the generation of the restore script for the single table is reactive but not proactive. In other words, the database administrator must wait for the user to request restoration of the single table before generating the restore script. Overall, a considerable amount of time and resources is used to generate the restore script after the request from the user.

Therefore, there is a need in the art for a method and apparatus for efficiently restoring a table in a database.

SUMMARY

Embodiments of the present disclosure, generally, comprise a method and apparatus for restoring a table in a database. In one embodiment, a method for restoring table data comprises identifying table data after completion of a backup process and generating at least one command for restoring the identified table data, where the at least one command is generated prior to a request to restore the identified table data. Embodiments of the invention further include an apparatus for performing the foregoing method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
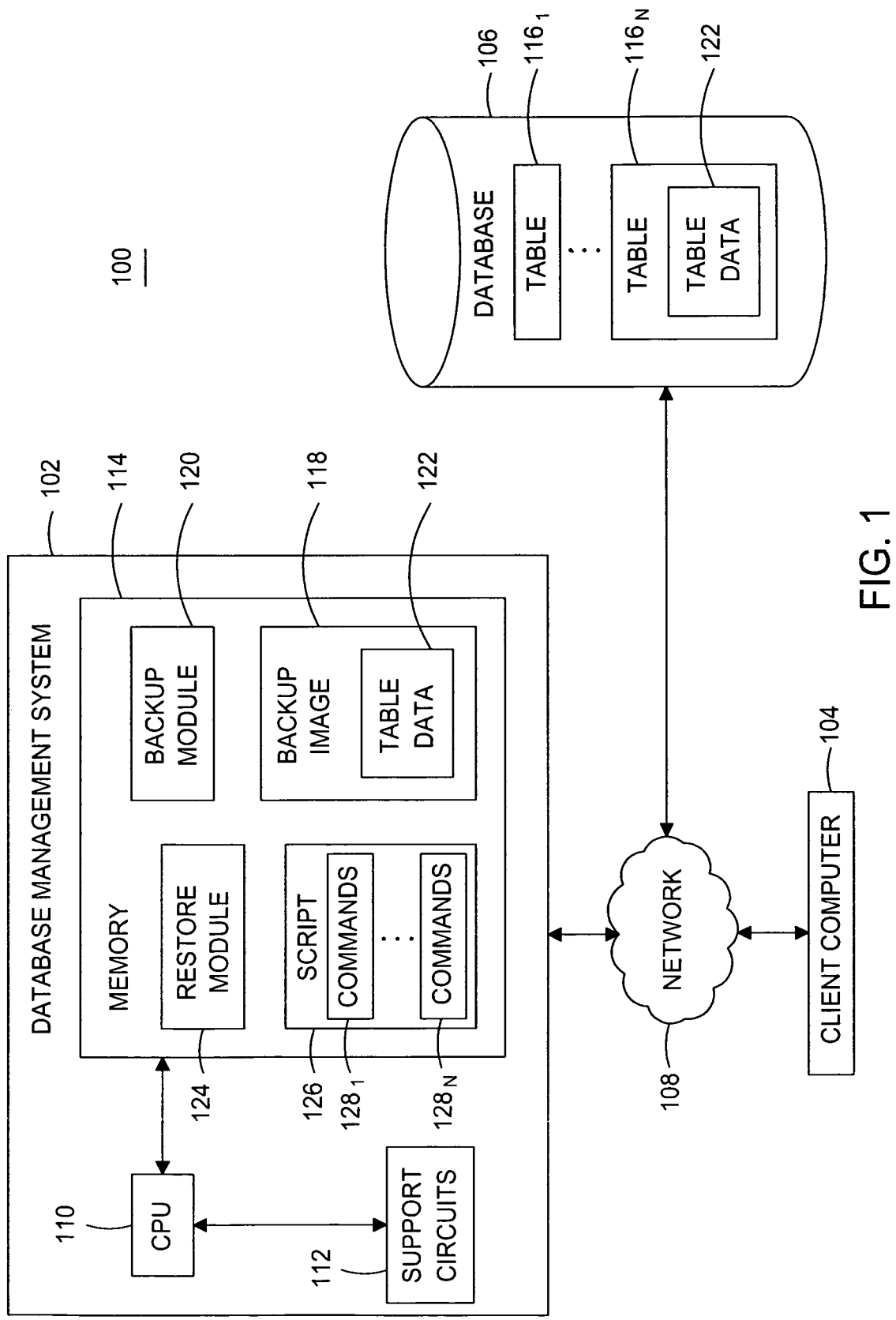
FIG. 1 depicts a block diagram of a system for restoring table data according to an embodiment of the present invention.

FIG. 1 depicts a block diagram of a system 100 for restoring table data in a database, according to one embodiment of the present invention. The system 100 comprises a database management system (DBMS) 102, a client computer 104, a database 106, coupled to each other through a network 108. The client computer 104 may be any computing device capable of interacting with the database 106 through the DBMS 102. The client computer 104 utilizes a query language (e.g., T-SQL) to perform operations on the database 106.

The database 106, generally, stores data for the client computer 104 in the form of a plurality of tables 116 where each table includes one or more rows of table data 122. The plurality of tables 116 may be organized in accordance with a schema, where the schema defines the relationships between two or more tables. For example, a first table comprising name data and address data is related to a second table comprising the name data and phone data because both tables use the name data as an index to other data in the tables.

The network 108 comprises a communication system that connects a computer system by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like.

The DBMS 102 comprises a Central Processing Unit (CPU) 110, various support circuits 112 and a memory 114. The DBMS 102 generally includes software designed to manage data stored within the database 106. The CPU 110 may comprise one or more commercially available microprocessors or microcontrollers that facilitate data processing and storage. Various support circuits 112 facilitate operation of the CPU 110 and may include clock circuits, power supplies, input/output circuits and/or the like. The memory 114 includes a read only memory, random access memory, disk drive storage, optical storage, removable storage and the like. The memory 114 includes various data, such as a backup image 118. The memory 114 includes various software packages, such as a backup module 120 and a restore module 124. Generally, the backup image 118 is a data repository where data from the plurality of tables 116 of the database 106 that has been backed up is stored and maintained. The backup image 118 comprises table data 122 stored by the backup module 116 during execution of a backup process on the database 106. The memory 114 also includes various scripts associated with the database 106, such as a restore script 126. The restore script 126 comprises a plurality of commands 128 generated by the restore module 124.

The backup module 120 initiates the execution of the backup process on the database 106. The backup process creates a copy of the table data 122 in the database 106 for storage in the backup image 118, so that these additional copies may be used to restore the original table data after a data loss event. The data loss event includes destruction and/or corruption of the table data 122 caused by an error within the database 106. For example, the user may delete or lose the table data 122 (e.g., by accident). In another example, the user incorrectly modified the table data 122 within the database 106 and cannot return the table data 122 back to a version devoid of the incorrect modifications.

The restore module 124 is configured to restore the table data 122 and/or return the database 106 to a state before the request to restore (e.g., the occurrence of the data loss event). The restore module 124 generates the plurality of commands 128 (e.g., T-SQL commands) for reinserting the table data 122 into the database 106, which may have been corrupted or accidentally lost, deleted or modified by the user. In one embodiment, each of the plurality commands 128 is an INSERT command (e.g., a T-SQL INSERT command) where the INSERT command includes row data of the table data 122. For example, a T-SQL command generated by the restore module 124 may be formatted into the following command: INSERT Table_Name (column_1, column_2) VALUES (Row Data_1, Row Data_2) where Row Data_1 and Row Data_2 correspond to two separate columns of one row within the table data 122 in the backup image 118.

In operation, the backup module 116 is executed and the table data 122 in the database 106 is stored in the backup image 118. In one embodiment, after completion of the backup process, the restore module 124 identifies the table data 122 in the backup image 118 and generates one or more T-SQL insert commands (e.g., the plurality of commands 128) for reinserting the table data 122 into the database 106. The T-SQL insert commands are executed upon a request to restore the table data 122. In one embodiment, the DBMS 102 automatically detects the request and executes the T-SQL insert commands. In another embodiment, the DBMS 102 detects the data loss event (e.g., error in the database 106), executes the one or more T-SQL commands will be executed and restores the table data 122. As discussed below, the restore script 126 comprising the one or more T-SQL insert commands will be generated by the restore module 124 after completion of the backup process, according to various embodiments of the present invention.

Figure 2:
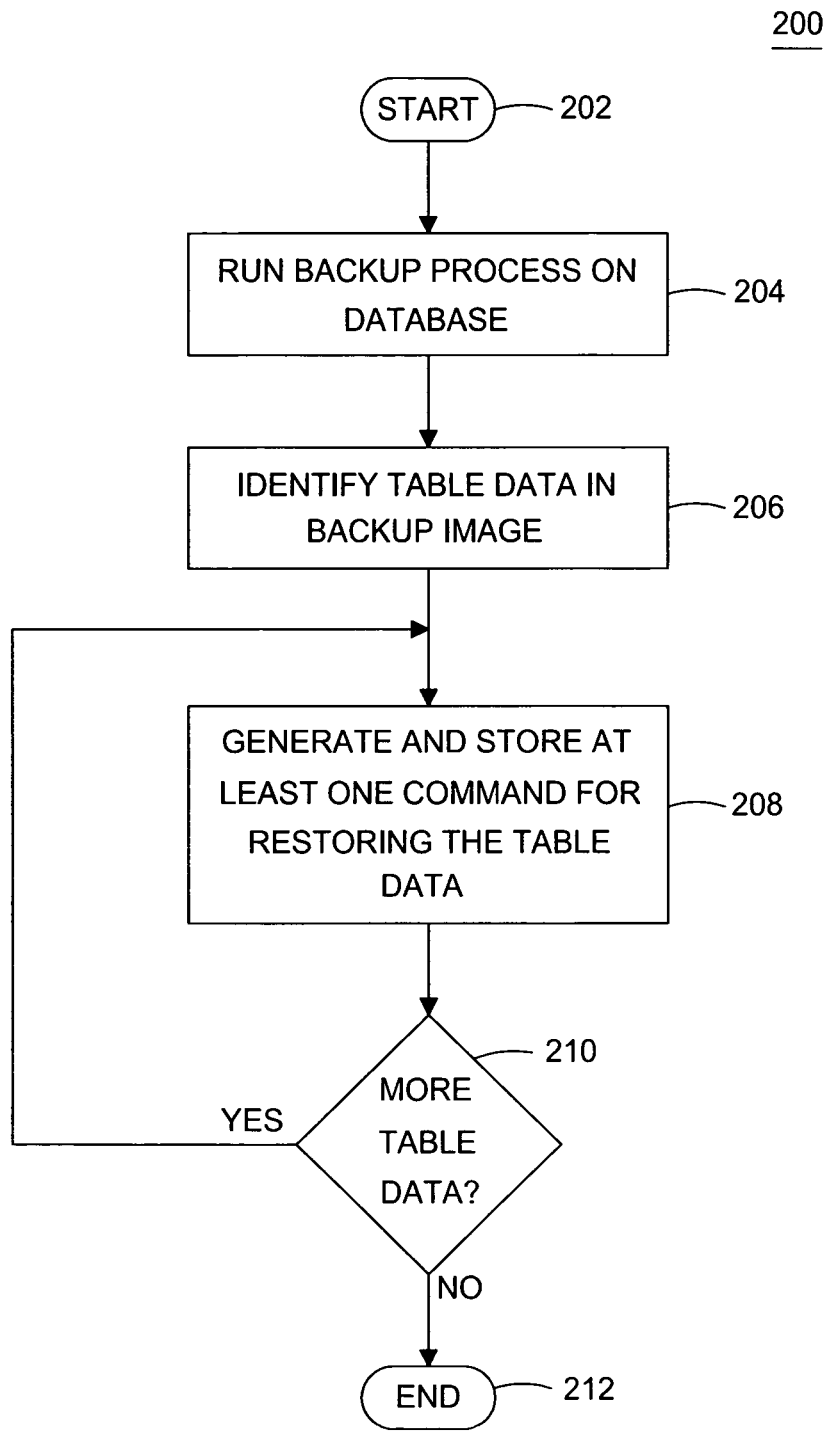
FIG. 2 depicts a flow diagram of a method for generating one or more commands for restoring table data, according to one or more embodiments of the present invention.

FIG. 2 depicts a flow diagram of a method 200 for generating one or more commands for restoring table data according to an embodiment of the present invention. The method 200 begins at step 202 and proceeds to step 204. At step 204, a backup process (e.g., initiated by the backup module 120 of FIG. 1), is executed on a database (e.g., the database 106). At step 206, table data (e.g., the table data 122 of FIG. 1) is identified after completion of the backup process. In one embodiment, a row of the table data in a backup image is assessed, as explained below with respect to FIG. 3. At step 208, one or more commands (e.g., the T-SQL commands) are generated, as explained above. At step 210, a determination is made as to whether the table data comprises more data to be restored. If the table data includes more data (option "YES"), the method 200 returns to step 208. At step 210, however, if the table data does not include more data (option "NO"), the method 200 proceeds to step 212. At step 212, the method 200 ends.

Figure 3:
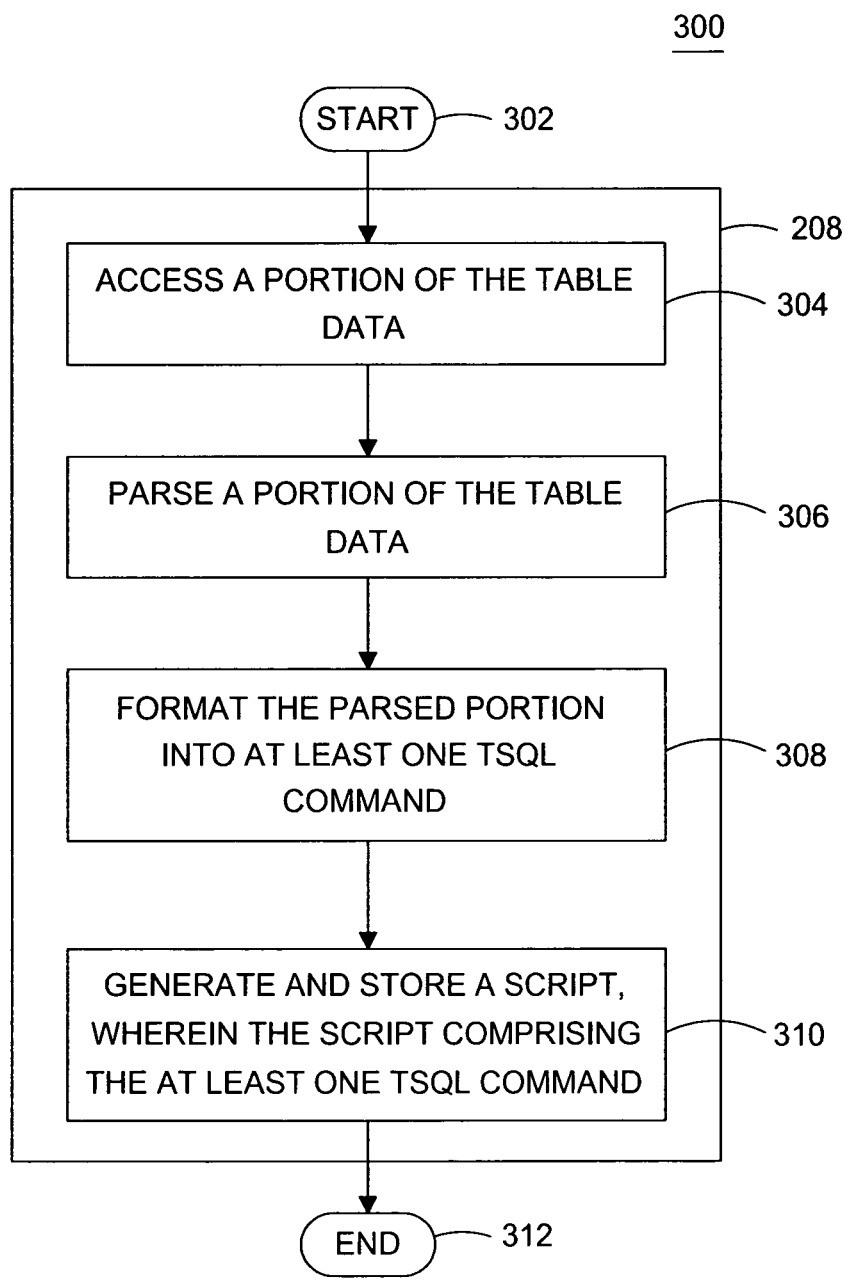
FIG. 3 depicts a flow diagram of a method for generating a script for restoring table data, according to one or more embodiments of the present invention.

FIG. 3 is a flow diagram of a method 300 for generating a script for restoring table data. The method 300 represents an embodiment of the step 208 of the method 200, as described above. The method 300 begins at step 302 and proceeds to step 304. At step 304, a portion of the table data 122 (e.g., a row of a corrupted, lost, deleted or modified table) in the backup image 118 is accessed (e.g., using address information). In one embodiment, the portion is a file block representing a row of the table data 122 where one or more file blocks form the table data 122 in the backup image 118. In one embodiment, each file block is located using the address information associated with the backup image 118.

At step 306, the portion of the table data 122 is parsed. In one embodiment, the row of the table 122 is separated into one or more columns of row data in accordance with the columns associated with the table data 122. At step 308, the parsed portion of the table data 122 (e.g., the row parsed into one or more columns) is formatted into one or more T-SQL commands for reinserting the table data 122. In one embodiment, a T-SQL command is defined to insert each column of the row data into a corresponding column of the table data in the database. For example, the format of the T-SQL command may resemble the following: INSERT TABLE_NAME (column_1, column_2) VALUES (Row Data_1, Row Data_2). At step 310, a script is generated and stored, which includes the one or more T-SQL commands. The stored script awaits executions when a need arises to restore the table data. As such, embodiments of the invention proactively produce restoration scripts when a backup process is executed. At step 312, the method 300 ends.

Figure 4:
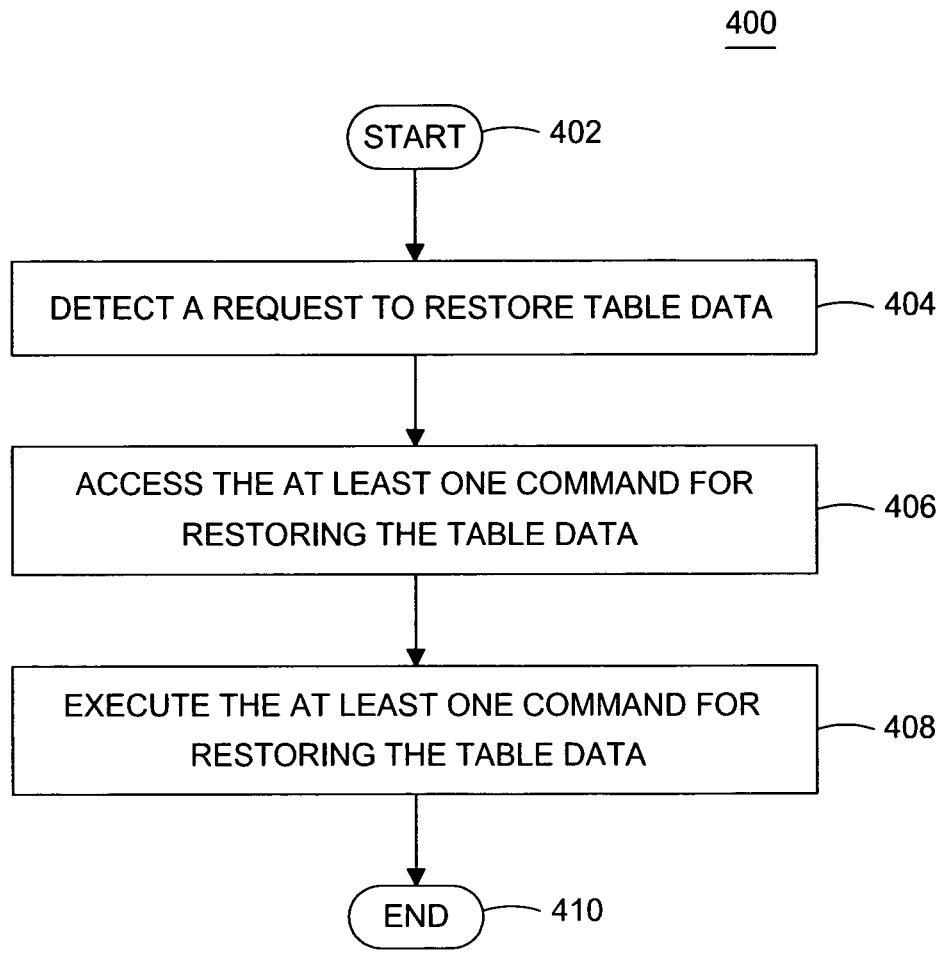
FIG. 4 depicts a flow diagram of a method for restoring table data once a request to restore the table data has been detected, according to one or more embodiments of the present invention.

FIG. 4 is a flow diagram of a method 400 for restoring table data once a request to restore a table is detected according to an embodiment of the present invention. The method 400 begins at step 402 and proceeds to step 404. At step 404, the request to restore the table data (e.g., an occurrence of an error in the database) is detected. At step 406, one or more commands for restoring the table data (e.g., T-SQL commands for reinserting the table data) are accessed. At step 408, the one or more commands (generally within a script) are executed. At this point, the table data is reinserted into the database, which is restored to a state prior to the request to restore the table data (e.g., prior to the occurrence of an error in the database). At step 410, the method 400 ends. By proactively generating table restoration commands, the embodiments of the invention provide efficient and automated restoration of individual tables of a database.

While the foregoing is directed to embodiments of the present invention, other and further embodiments of the invention may be devised without departing from the basic scope thereof, and the scope thereof is determined by the claims that follow.

The invention claimed is:

1. A method for restoring a table in a database comprising:
    identifying a copy of first table data after completion of a backup process of the database, wherein
        the database comprises at least a first table and a second table,
        the first table data comprises data stored in the first table,
        second table data comprises data stored in the second table,
        the backup process produces a backup of the first table data,
        the backup of the first table data comprises copies of a plurality of table data blocks,
        the copies of the plurality of table data blocks comprise the copy of the first table data, and
        the identifying identifies the copy of the first table data in the backup of the first table data; and
    generating a command for restoring the first table data from the backup of the first table data, wherein
        the command is generated prior to a detection of a request to restore the first table data and in response to completion of the backup process producing the backup of the first table data,
        the command is configured to be executed in response to the detection of the request to restore the first table data without restoring the second table data, and the generating the command comprises:
            accessing the copy of the first table data in the backup of the first table data, wherein the accessing is performed based on the identifying,
            parsing a portion of the copy of the first table data, and
            including the parsed portion of the copy of the first table data in the command.

2. The method of claim 1, wherein
    the generating the command further comprises generating a script, and
    the script comprises the command for restoring the first table data.

3. The method of claim 1, wherein the generating the command further comprises generating a Transact-SQL command for inserting the parsed portion of the copy of the first table data into the database.

4. The method of claim 1, wherein the generating the command further comprises accessing the portion of the copy of the first table data from within the backup.

5. The method of claim 4, wherein
    the accessing the portion further comprises using address information associated with the portion of the copy of the first table data in the backup to access at least one file block in the backup, and
    the at least one file block represents the portion of the copy of the first table data.

6. The method of claim 4, wherein the portion of the copy of the first table data is a row, and the parsing the portion of the copy of the first table data comprises parsing the row of the parsed portion of the copy of the first table data into at least one column.

7. The method of claim 6, wherein the including the parsed portion of the copy of the first table data comprises formatting the row of the parsed portion of the copy of the first table data into the command.

8. The method of claim 1, wherein the generating the command is performed prior to detection of an error in the database.

9. An apparatus for restoring a table in a database comprising:
    a non-transitory computer-readable memory; and
    a processor coupled to the non-transitory computer-readable memory, wherein the processor is configured to:
        identify a copy of first table data in a backup image after completion of a backup process of the database, wherein
            the backup image is associated with the database,
            the database comprises at least a first table and a second table,
            the first table data comprises data stored in the first table,
            second table data comprises data stored in the second table,
            the backup image comprises a copy of the first table data,
            the backup image comprises copies of a plurality of table data blocks, and
            the copies of the plurality of table data blocks comprise the copy of the first table data; and
        generate a command for restoring the first table data from the backup image, wherein
            the command is generated prior to detection of a request for restoring the first table data from the backup image and in response to completion of the backup process producing the backup image,
            the command is generated by:
                accessing the copy of the first table data in the backup image, wherein
                    the accessing is performed based on the identifying,
                parsing a portion of the copy of the first table data, and
                including the parsed portion of the copy of the first table data in the command, and
            the command, when executed, restores the first table data without restoring the second table data.

10. The apparatus of claim 9, wherein the command is automatically executed upon detection of an error in the database.

11. The apparatus of claim 9, wherein the processor is further configured to generate a Transact-SQL command for inserting the first table data into the database.

12. The apparatus of claim 9, wherein the processor is further configured to access a row of the copy of the first table data from the backup image.

13. The apparatus of claim 9, wherein the processor is further configured to parse the portion of the copy of the first table data by parsing a row of the copy of the first table data into at least one column.

14. The apparatus of claim 13, wherein the processor is further configured to include the parsed portion of the copy of the first table data by formatting the row of the copy of the first table data into a Transact-SQL command.

15. The apparatus of claim 9, wherein the command is generated prior to detection of an error in the database.

16. A non-transitory computer-readable storage medium storing instructions executable by a processor, wherein the instructions, when executed, perform a method for restoring a table in a database comprising:
- identifying a copy of first table data after completion of a backup process of the database, wherein
  - the database comprises at least a first table and a second table,
  - the first table data comprises data stored in the first table,
  - second table data comprises data stored in the second table,
  - the backup process produces a backup of the first table data,
  - the backup of the first table data comprises copies of a plurality of table data blocks,
  - the copies of the plurality of table data blocks comprise the copy of the first table data, and
  - the identifying identifies the copy of the first table data in the backup of the first table data; and
- generating a command for restoring the first table data from the backup of the first table data, wherein
  - the command is generated prior to a detection of a request to restore the first table data and in response to completion of the backup process producing the backup of the first table data,
  - the command is configured to be executed in response to the detection of the request to restore the first table data without restoring the second table data, and the generating the command comprises:
    - accessing the copy of the first table data in the backup of the first table data, wherein the accessing is performed based on the identifying,
    - parsing a portion of the copy of the first table data, and
    - including the parsed portion of the copy of the first table data in the command.

17. The non-transitory computer-readable storage medium of claim 16, wherein the command is further configured to reinsert the copy of the first table data into the database.

18. The non-transitory computer-readable storage medium of claim 17, wherein the command is automatically executed in response to the detection of the request to restore the first table data.

19. The non-transitory computer-readable storage medium of claim 16, wherein the including the parsed portion of the copy of the first table data comprises generating a Transact-SQL command for inserting a row of the first table data into the database.

20. The non-transitory computer-readable storage medium of claim 16, wherein
- the backup process stores the copy of the first table data in the backup of the first table data, and
- the command accesses the copy of the first table data in the backup of the first table data.

\* \* \* \* \*